US012774925B2

(12) United States Patent
Pratt

(10) Patent No.: US 12,774,925 B2
(45) Date of Patent: Oct. 27, 2026

(54) SENSOR WITH REDUCED POWER CONSUMPTION AND ASSOCIATED METHOD

(71) Applicant: Life Safety Distribution GmbH, Rolle (CH)

(72) Inventor: Keith Francis Edwin Pratt, Portsmouth (GB)

(73) Assignee: Life Safety Distribution GmbH, Rolle (CH)

( * ) Notice: Subject to any disclaimer, the term of this patent is extended or adjusted under 35 U.S.C. 154(b) by 504 days.

(21) Appl. No.: 18/227,547

(22) Filed: Jul. 28, 2023

(65) Prior Publication Data

US 2025/0035491 A1 Jan. 30, 2025

(51) Int. Cl.
*G01K 7/02* (2021.01)

(52) U.S. Cl.
CPC ......... *G01K 7/021* (2013.01); *G01K 2215/00* (2013.01)

(58) Field of Classification Search
CPC ...... G01K 7/021; G01K 2215/00; G01K 7/02; G01J 5/12; G01N 25/18
See application file for complete search history.

(56) References Cited

U.S. PATENT DOCUMENTS 5,044,764 A * 9/1991 Aoki ...................... G01N 27/18 374/54
5,588,417 A 12/1996 Kotwicki et al.
6,129,673 A * 10/2000 Fraden ...................... G01J 5/16 600/549
6,354,160 B1 3/2002 Staples et al.
6,578,563 B2 6/2003 Hada et al.
10,705,041 B2 7/2020 Swanson et al.
(Continued)

FOREIGN PATENT DOCUMENTS

CN 103954900 A * 7/2014
CN 108414909 B * 11/2019 ......... G01R 31/2619
(Continued)

OTHER PUBLICATIONS

Extended European Search Report Mailed on Jan. 10, 2025 for EP Application No. 24184332, 14 page(s).
(Continued)

*Primary Examiner* — Laura Martin Sweeney
*Assistant Examiner* — Julia Fitzpatrick
(74) *Attorney, Agent, or Firm* — Alston & Bird LLP

(57) ABSTRACT

A sensing device is provided. For example, a sensing device may include a sensing element, a power supply, and a processor that controls application of power from the power supply to the sensing element and measures a response of the sensing element. The processor controls the application of power from the power supply to the sensing element according to an adaptive duty cycle in which power is applied to the sensing element repeatedly for a steady-state time period and, for each application of power for a steady-state time period, power is applied to the sensing element two or more times for a non-steady-state time period. The steady-state time period is a time period which is long enough for the sensing element to reach a steady state response. The non-steady-state time period is a time period which is not long enough for the sensing element to reach a steady state response.

18 Claims, 4 Drawing Sheets

(56) References Cited

U.S. PATENT DOCUMENTS

| | | | | |
|---|---|---|---|---|
| 11,199,148 | B2 | 12/2021 | Wakao et al. | |
| 11,454,622 | B2 | 9/2022 | Billat et al. | |
| 2004/0011403 | A1 * | 1/2004 | Martin | G05D 7/0635 137/312 |
| 2005/0026294 | A1 * | 2/2005 | Barber | G01N 33/367 422/54 |
| 2006/0114113 | A1 | 6/2006 | Yokosawa et al. | |
| 2008/0226505 | A1 | 9/2008 | Willettt et al. | |
| 2013/0256156 | A1 | 10/2013 | Wu et al. | |
| 2017/0276527 | A1 | 9/2017 | Chen et al. | |
| 2021/0181135 | A1 | 6/2021 | Santoro, Jr. et al. | |
| 2021/0389786 | A1 | 12/2021 | Maccioni et al. | |
| 2022/0120702 | A1 | 4/2022 | Udrea et al. | |

FOREIGN PATENT DOCUMENTS

| | | | | |
|---|---|---|---|---|
| DE | 102015218237 | A1 * | 3/2017 | G04F 10/10 |
| EP | 3567367 | B1 * | 8/2021 | G01N 25/18 |
| JP | 2007-218783 | A | 8/2007 | |
| WO | WO-2013075111 | A9 * | 9/2013 | G01F 1/684 |
| WO | 2022/069875 | A1 | 4/2022 | |

OTHER PUBLICATIONS

O. Monereo et al., "Self-heating in pulsed mode for signal quality improvement: Application to carbon nanostructures-based sensors," Sensors and Actuators B, 226:254-265, (2016).

Yoonchul Baek et al., "Adaptive Preheating Duration Control for Low-Power Ambient Air Quality Sensor Networks," Sensors, 14:5536-5551, (2014).

* cited by examiner

SENSOR WITH REDUCED POWER CONSUMPTION AND ASSOCIATED METHOD

FIELD OF THE INVENTION

Embodiments of the present disclosure generally relate to sensing devices, and, more particularly, to heated sensing devices.

BACKGROUND

Heated sensing devices, such as thermal conductivity gas sensing devices, require power to raise the sensing element to the desired operating temperature. In many applications, there is a desire to reduce the power to a low level, for example to extend battery life in a portable device. However, for some sensing device types, there is a tradeoff between power and accuracy.

Such heated sensing devices are plagued by technical challenges and limitations. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to sensing devices and associated methods of reducing power consumption of sensing devices.

In accordance with various embodiments of the present disclosure, a sensing device is provided. In some embodiments, the sensing device comprises a sensing element, a power supply, and a processor that controls application of power from the power supply to the sensing element and measures a response of the sensing element to the application of power. The processor controls the application of power from the power supply to the sensing element according to an adaptive duty cycle in which power is applied to the sensing element repeatedly for a steady-state time period and, for each application of power for a steady-state time period, power is applied to the sensing element two or more times for a non-steady-state time period. The steady-state time period is a time period which is long enough for the sensing element to reach a steady state response. The non-steady-state time period is a time period which is not long enough for the sensing element to reach a steady state response.

In some embodiments, the sensing element comprises a heated sensing element and the measured response is a temperature of the sensing element.

In some embodiments, the sensing element comprises a thermopile and the measured temperature of the sensing element is based on a voltage output of the thermopile.

In some embodiments, the processor applies power from the power supply to the sensing element at predetermined intervals of time.

In some embodiments, after each application of power, the processor compares the measured response to detect a change from a prior application of power.

In some embodiments, after each application of power for a non-steady-state time period, the processor compares the measured response to a measured response for a corresponding portion of a prior steady-state time period to detect a change from the corresponding portion of the prior steady-state time period.

In some embodiments, if the processor detects a change from a prior application of power for a non-steady-state time period, the processor controls the application of power from the power supply to the sensing element according to a fixed duty cycle in which power is applied to the sensing element repeatedly only for the steady-state time period until a change from the prior application of power is no longer detected.

In some embodiments, the non-steady-state time period is variable and each non-steady-state time period ends if a change in the measured response from a prior application of power is detected.

In some embodiments, the non-steady-state time period is variable and each non-steady-state time period ends when sufficient response data is measured to determine that no change in the measured response from a prior application of power has occurred.

In some embodiments, the processor controls a display of the response of the sensing element to the application of power based on one of (i) a response of the sensing element to a most recent application of power for a steady-state time period, (ii) an average of responses to prior applications of power for steady-state time periods, or (iii) a weighted average of responses to prior applications of power for steady-state time periods and non-steady-state time periods.

In accordance with various embodiments of the present disclosure, a method of reducing power consumption of a sensing device is provided. In some embodiments, the method comprises controlling, by a processor of the sensing device, application of power from a power supply of the sensing device to a sensing element of the sensing device; and measuring, by the processor, a response of the sensing element to the application of power. The processor controls the application of power from the power supply to the sensing element according to an adaptive duty cycle in which power is applied to the sensing element repeatedly for a steady-state time period and, for each application of power for a steady-state time period, power is applied to the sensing element two or more times for a non-steady-state time period. The steady-state time period is a time period which is long enough for the sensing element to reach a steady state response. The non-steady-state time period is a time period which is not long enough for the sensing element to reach a steady state response.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
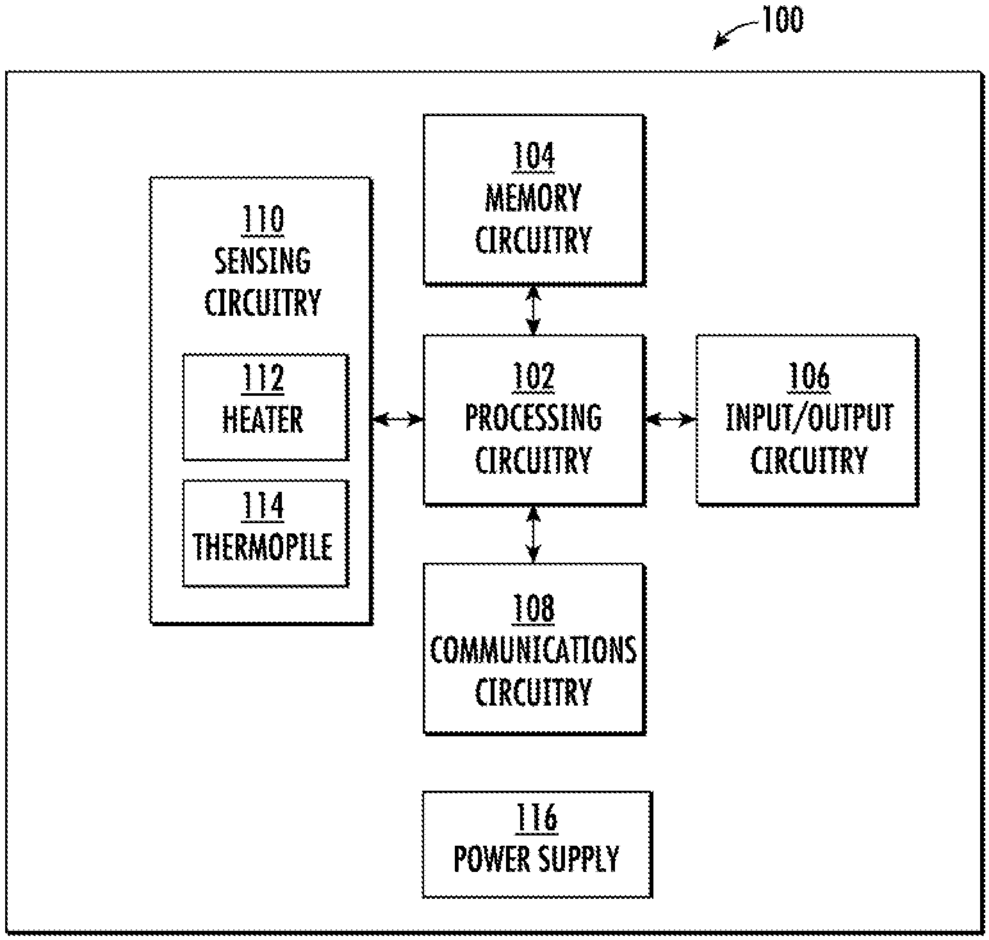
FIG. 1 is a block diagram of an example sensing device in accordance with example embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," "bottom," "left," "right," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The phrases "in one example," "according to one example," "in some examples," and the like generally mean that the particular feature, structure, or characteristic following the phrase may be included in at least one example of the present disclosure and may be included in more than one example of the present disclosure (importantly, such phrases do not necessarily refer to the same example).

If the specification states a component or feature "may," "can," "could," "should," "would," "preferably," "possibly," "typically," "optionally," "for example," "as an example," "in some examples," "often," or "might" (or other such language) be included or have a characteristic, that specific component or feature is not required to be included or to have the characteristic. Such component or feature may be optionally included in some examples, or it may be excluded.

The word "example" or "exemplary" is used herein to mean "serving as an example, instance, or illustration." Any implementation described herein as "example" or "exemplary" is not necessarily to be construed as preferred or advantageous over other implementations.

The term "electronically coupled," "electronically coupling," "electronically couple," "in communication with," "in electronic communication with," or "connected" in the present disclosure refers to two or more elements or components being connected through wired means and/or wireless means, such that signals, electrical voltage/current, data and/or information may be transmitted to and/or received from these elements or components.

The term "component" may refer to an article, a device, or an apparatus that may comprise one or more surfaces, portions, layers and/or elements. For example, an example component may comprise one or more substrates that may provide underlying layer(s) for the component and may comprise one or more elements that may form part of and/or are disposed on top of the substrate. In the present disclosure, the term "element" may refer to an article, a device, or an apparatus that may provide one or more functionalities.

The term "sensing device" or "sensing instrument" may refer to an article, a device, or an apparatus that measures physical input from its environment and converts the input into data that can be interpreted by either a human or a machine. Sensing devices may be utilized in a variety of applications including the detection of dangerous gases in the environment. Sensing devices may be mounted in a fixed location or may be portable so as to be carried by a user. Portable sensing devices are typically battery-powered. One common type of sensing device is a thermal conductivity gas sensing device which can measure the concentration of gas according to the difference of thermal conductivity of different gases and air.

The term "sensor," "sensor circuitry," "sensing circuitry," "sensing element," and the like may refer to one or more components, integrated circuits, and the like within a sensing device that interacts with the environment, detects the input to be detected (e.g., presence of a dangerous gas), and provides an output (e.g., voltage) to another component in the sensing device to be interpreted. In an example thermal conductivity gas sensing device, the sensing circuitry comprises a resistive heating element and one or more thermopiles. When power is applied to the resistive heating element, a temperature gradient is produced across the thermopile(s) which produce an output voltage that corresponds to the temperature. When exposed to a gas with higher thermal conductivity than air, there is more heat loss from the resistive heating element and therefore a lower temperature. This difference in temperature varies with the concentration of the gas and can be detected, measured, and used to provide an alert.

Heated sensing devices, such as thermal conductivity gas sensing devices, require power to raise the sensing element to the desired operating temperature. Because many such sensing device are portable and therefore battery powered, it is desirable to reduce power consumption where possible to extend battery life. One way to reduce power consumption is to operate the sensing circuitry on a duty cycle rather than continuously. As an example, a thermal conductivity sensing circuitry which requires a power of 20 mW when operated continuously may be operated at a duty cycle of 10%, with one reading per second, giving an average power of 2 mW while still achieving desired accuracy. However, running at a shorter duty cycle may reduce the accuracy of the reading to a potentially unacceptable level. Similarly, taking readings less frequently than once per second may make the response time too slow. There is, therefore, a compromise between power, accuracy, and response time when using a fixed duty cycle of powering the sensor.

To address challenges and limitations associated with conventional sensing devices, various examples of the present disclosure may be provided. For example, various examples of the present disclosure may provide example sensing devices, apparatuses, methods, and systems with a reduced power consumption as compared to some conventional sensing devices. An example sensing device provides power to the sensing circuitry using an adaptive duty cycle as described herein. Embodiments of the present disclosure may be used with any suitable sensing device for which power may be applied using an adaptive duty cycle, including but not limited to heated sensing devices, such as heated metal oxide sensing devices, heated catalytic bead sensing devices, and thermal flow sensing devices.

Referring now to FIG. 1, a block diagram of an example sensing device 100 in accordance with various embodiments of the present disclosure is provided. As depicted in FIG. 1, in some embodiments the sensing device 100 comprises a processor or processing circuitry 102, memory circuitry 104, input/output circuitry 106, communications circuitry 108, sensing circuitry 110, and a power supply 116. In some embodiments, the sensing device 100 is configured to execute and perform the operations described herein.

Although components are described with respect to functional limitations, it should be understood that at least some of the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

Processing circuitry 102 may be embodied in a number of different ways. In various embodiments, the use of the terms "processor" or "processing circuitry" should be understood to include a single core processor, a multi-core processor, multiple processors internal to the sensing device 100, and/or one or more remote or "cloud" processor(s) external to the sensing device 100. In some example embodiments, processing circuitry 102 may include one or more processing devices configured to perform independently. Alternatively, or additionally, processing circuitry 102 may include one or more processor(s) configured in tandem via a bus to enable independent execution of operations, instructions, pipelining, and/or multithreading.

In an example embodiment, the processing circuitry 102 may be configured to execute instructions stored in the memory circuitry 104 or otherwise accessible to the processor. Alternatively, or additionally, the processing circuitry 102 may be configured to execute hard-coded functionality. As such, whether configured by hardware or software methods, or by a combination thereof, processing circuitry 102 may represent an entity (e.g., physically embodied in circuitry) capable of performing operations according to embodiments of the present disclosure while configured accordingly. Alternatively, or additionally, processing circuitry 102 may be embodied as an executor of software instructions, and the instructions may specifically configure the processing circuitry 102 to perform the various algorithms embodied in one or more operations described herein when such instructions are executed. In some embodiments, the processing circuitry 102 includes hardware, software, firmware, and/or a combination thereof that performs one or more operations described herein.

In some embodiments, the processing circuitry 102 (and/or co-processor or any other processing circuitry assisting or otherwise associated with the processor) is/are in communication with the memory circuitry 104 via a bus for passing information among components of the sensing device 100.

Memory or memory circuitry 104 may be non-transitory and may include, for example, one or more volatile and/or non-volatile memories. In some embodiments, the memory circuitry 104 includes or embodies an electronic storage device (e.g., a computer readable storage medium). In some embodiments, the memory circuitry 104 is configured to store information, data, content, applications, instructions, or the like, for enabling the sensing device 100 to carry out various operations and/or functions in accordance with example embodiments of the present disclosure.

Input/output circuitry 106 may be included in the sensing device 100. In some embodiments, input/output circuitry 106 may provide output to the user and/or receive input from a user. The input/output circuitry 106 may be in communication with the processing circuitry 102 to provide such functionality. The input/output circuitry 106 may comprise one or more user interface(s). In some embodiments, a user interface may include a display that comprises the interface(s) rendered as a web user interface, an application user interface, a user device, a backend system, or the like. In some embodiments, the input/output circuitry 106 also includes a keyboard, a mouse, a joystick, a touch screen, touch areas, soft keys a microphone, a speaker, or other input/output mechanisms. The processing circuitry 102 and/or input/output circuitry 106 may be configured to control one or more operations and/or functions of one or more user interface elements through computer program instructions (e.g., software and/or firmware) stored on a memory accessible to the processor (e.g., memory circuitry 104, and/or the like). In some embodiments, the input/output circuitry 106 includes or utilizes a user-facing application to provide input/output functionality to a computing device and/or other display associated with a user.

Communications circuitry 108 may be included in the sensing device 100. The communications circuitry 108 may include any means such as a device or circuitry embodied in either hardware or a combination of hardware and software that is configured to receive and/or transmit data from/to a network and/or any other device, circuitry, or module in communication with the sensing device 100. In some embodiments the communications circuitry 108 includes, for example, a network interface for enabling communications with a wired or wireless communications network. Additionally or alternatively, the communications circuitry 108 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 108 may include circuitry for interacting with an antenna(s) and/or other hardware or software to cause transmission of signals via the antenna(s) and/or to handle receipt of signals received via the antenna(s). In some embodiments, the communications circuitry 108 enables transmission to and/or receipt of data from a user device, one or more sensors, and/or other external computing device(s) in communication with the sensing device 100.

The sensing circuitry 110 may comprise any suitable circuitry to provide the desired sensing functionality. In the case of a thermal conductivity gas sensing device, the sensing circuitry 110 comprises a resistive heating element 112 and one or more thermopiles 114.

The power supply 116 provides electrical power to the sensing device 100, including power to the sensing circuitry 110. The power supply 116 may comprise any suitable power supply, and, for a portable sensing device is likely to comprise one or more batteries.

In some embodiments, two or more of the sets of circuitries 102-110 are combinable. Alternatively, or additionally, one or more of the sets of circuitry 102-110 perform some or all of the operations and/or functionality described herein as being associated with another circuitry. In some embodiments, two or more of the sets of circuitry 102-110 are combined into a single module embodied in hardware, software, firmware, and/or a combination thereof.

While the description above provides an example sensing device 100, it is noted that the scope of the present disclosure is not limited to the description above. In some examples, an example sensing device 100 in accordance with the present disclosure may be in other forms. In some examples, an example sensing device 100 may comprise one or more additional and/or alternative elements, and/or may be structured differently than that illustrated in FIG. 1.

Figure 2:
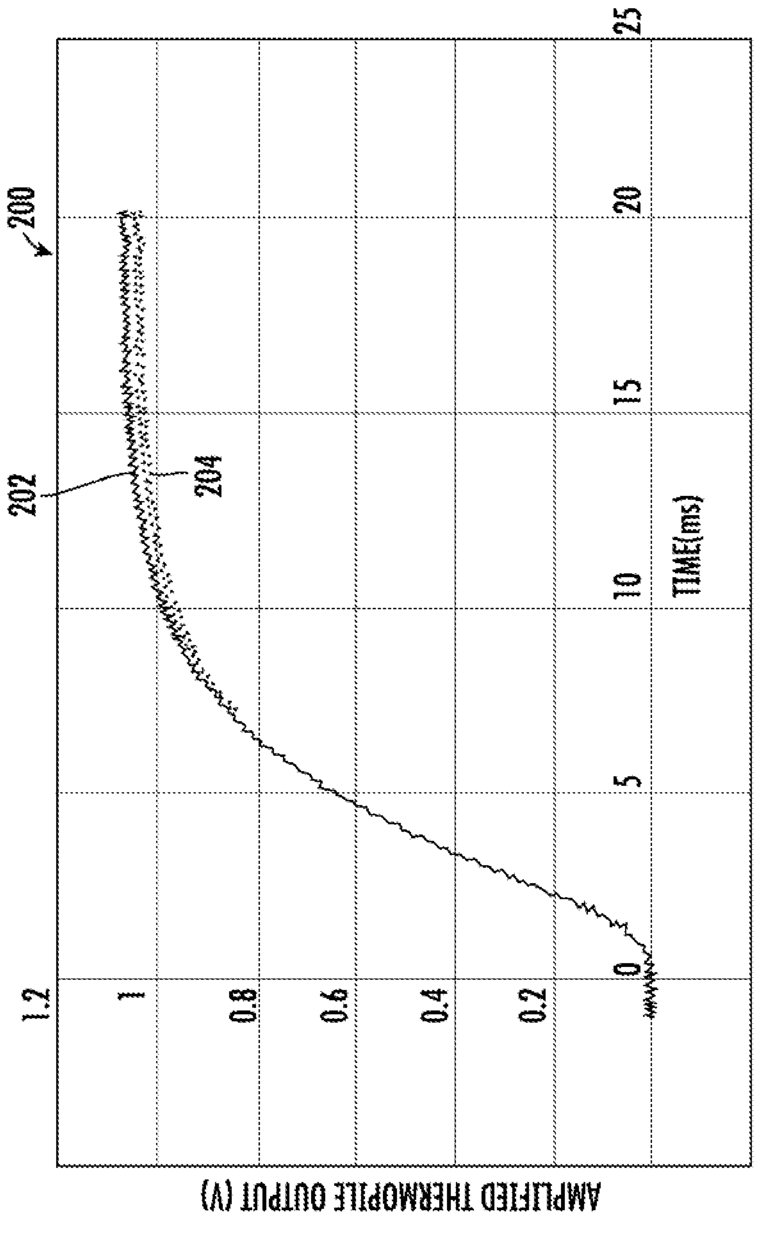
FIG. 2 is a graph illustrating the transient response of a heated sensing devices of the example sensing device of FIG. 1.

As described above, when power is applied to a resistive heating element of a thermal conductivity gas sensing device, a temperature gradient is produced across the thermopile(s) which produce an output voltage that corresponds to the temperature. Reference will now be made FIG. 2, which is a graph 200 illustrating the transient response of an example thermal conductivity gas sensing device. FIG. 2 illustrates two different example transient response curves. (Note that in a real-world example sensing device, these two different response curves would not exist at the same time as they show different gas concentrations. Both curves are included in FIG. 2 for illustrative purposes.) Each response curve plots the thermopile voltage output in volts over time in milliseconds. The first response curve 202 represents the thermopile voltage output when the ambient air is clear and there is no detectable presence of a potentially harmful gas which the device is designed to detect. The second response curve 204 represents the thermopile voltage output when there is 2% (by volume) hydrogen present. As seen in FIG. 2, there is only a small difference in the thermopile voltage output between the two conditions. As further seen in FIG. 2, the thermopile voltage output curves are "noisy." As yet further seen in FIG. 2, it takes time for the thermopile voltage output to ramp up to a steady state condition in which the thermopile voltage output is relatively constant. Given the noisy signals, the thermopile voltage output may not reach a completely steady state condition. However, a condition in which the thermopile voltage output does not vary by more than a suitable threshold (e.g., 5%) may be considered steady state for purposes of embodiments of the disclosure. In the example illustrated in FIG. 2, the thermopile voltage output reaches steady state about 15-20 milliseconds after power is supplied to the sensing circuitry. For about the first 6 milliseconds after power is supplied to the sensing circuitry, any difference in the response curves is not discernible within the noisy signals. From about 7 milliseconds after power is supplied to the sensing circuitry to when steady state is reached, a difference in the response curves is discernible but the magnitude of the difference is difficult to determine because of the noise. Thus, while a difference in the response curves is discernible prior to reaching steady state, the accuracy of the magnitude of the difference (and thus the amount of the detected gas) is lower. However, as described further below, this lower accuracy may be acceptable under certain circumstances to reduce power consumption.

The sensing devices of various embodiments of the present disclosure use an adaptive duty cycle in which, for example, an occasional, more accurate "long" duty cycle in which the sensing circuitry is powered long enough to reach steady state is interspersed with a number of shorter, less accurate "short" or "variable" duty cycles (which may be fixed length or variable length), thereby achieving a combination of good overall accuracy and lower power without compromising speed of response.

The sensing devices of various embodiments of the present disclosure make use of the fact that a sensing device for, e.g., industrial safety gas detection, often does not need to provide high accuracy at short timescales, only over a longer average period. For short timescales (e.g., less than 10 seconds to 1 minute), accuracy can be compromised in some embodiments provided that the sensor still responds quickly (e.g., within a few seconds) to larger potentially hazardous concentrations. In some embodiments, for example, it is possible to take one more accurate (i.e., longer, steady state) reading every 10 seconds to 1 minute, and multiple less accurate (e.g., shorter, non-steady-state) readings every 1 second and obtain acceptable accuracy and response time with less power consumed.

In some embodiments, a weighted average of the readings, with more emphasis on the longer, more accurate readings, provides a long term accurate reading, while the shorter, more frequent, less accurate readings once a second still provide fast response. For example, if nine shorter, more frequent readings are taken for every one longer, more accurate reading, each longer, more accurate reading may be weighted as much as nine shorter, more frequent readings.

In some embodiments, if the shorter, more frequent readings detect a significant change in gas concentration, the sensor defaults to doing longer, more accurate readings (without any shorter, less accurate readings) more frequently (e.g., every 1 second) until the gas reading either stabilizes or reduces back below a threshold.

In one specific example, a thermal conductivity sensing device has a thermal time constant of around 5 to 10 milliseconds. In such an example, to obtain an accurate low noise reading, it may be necessary to heat the sensing circuitry for approximately 100 milliseconds to allow time for the reading to stabilize and to average enough data to filter out noise. However, to get a less accurate reading in such an example, it may not be necessary to average a lot of data and it may not be necessary to wait for the reading to reach a steady state. For example, the sensing circuitry could be heated for only 10 milliseconds and its transient response compared to the first 10 milliseconds of the latest "full" (100 millisecond) reading. In such an example, if the transients are sufficiently similar (e.g., within 0.1%), then there is enough data to confirm that the gas concentration has not changed significantly.

In some embodiments, an adaptive approach could also be used in which, rather than operating for a specified time, the sensing circuitry can be heated and its transient monitored continuously until there is sufficient data to determine whether the gas concentration has changed significantly, at which point the power to the sensing circuitry heater can be turned off and the processing circuitry put into sleep mode, thereby reducing the power down to almost zero.

In some embodiments, a more accurate average reading could be obtained by averaging only the longer readings, giving an accurate reading which updates less frequently (e.g., every 10 seconds). Or, more preferably, in some embodiments a running average is used. In some embodiments, the average is weighted in proportion to the "on" time of each measurement so that the overall average reading remains accurate, but an updated reading is obtained more frequently (e.g., every 1 second).

In embodiments of the present disclosure, the reduction in power can be substantial while maintaining the desired accuracy and response speed. For example, an example sensing circuitry may consume around 20 milliwatts when powered continuously. If the same example sensing circuitry is pulsed for 100 milliseconds every 1 second (i.e., a fixed duty cycle), the sensing circuitry will consume an average of 2 milliwatts. If the same example sensing circuitry is pulsed for, e.g., 10 milliseconds every 1 second (i.e., a fixed duty cycle, but with all short readings), the sensing circuitry will consume an average of 0.2 milliwatts but the accuracy and noise would be unacceptable. So, in accordance with embodiments of the disclosure, if the same example sensing circuitry is pulsed for 100 milliseconds per second every 10 readings and 10 milliseconds per second for the other 9 readings, the average power consumed will be 0.38 milliwatts and the accuracy would be acceptable. This is an example only and the actual duty cycles could be tailored according to the accuracy and response time requirements of the application.

Figure 3A:
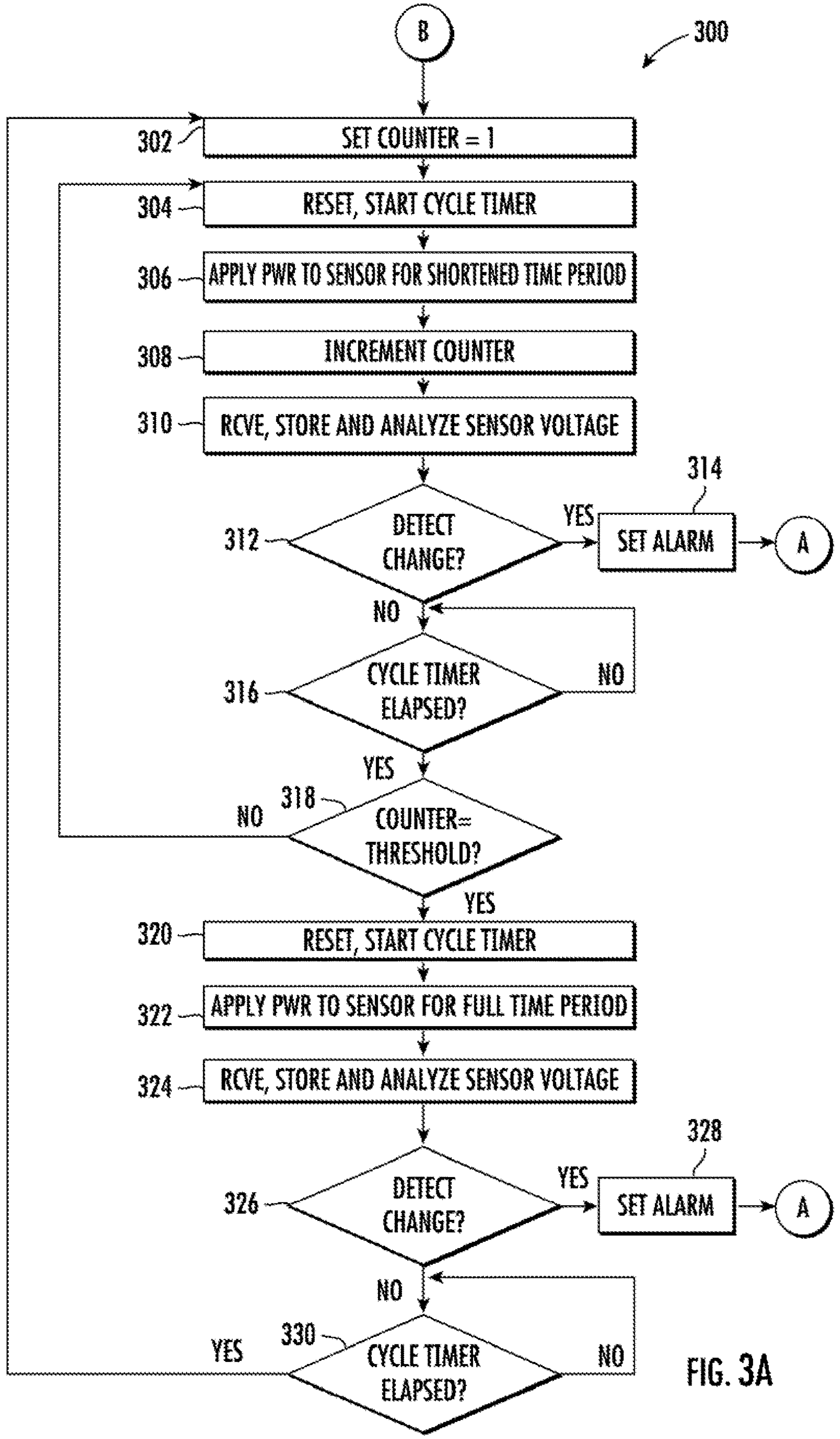
FIGS. 3A and 3B are a flowchart illustrating an example method of operating an example sensing device in accordance with example embodiments of the present disclosure.
Figure 3B:
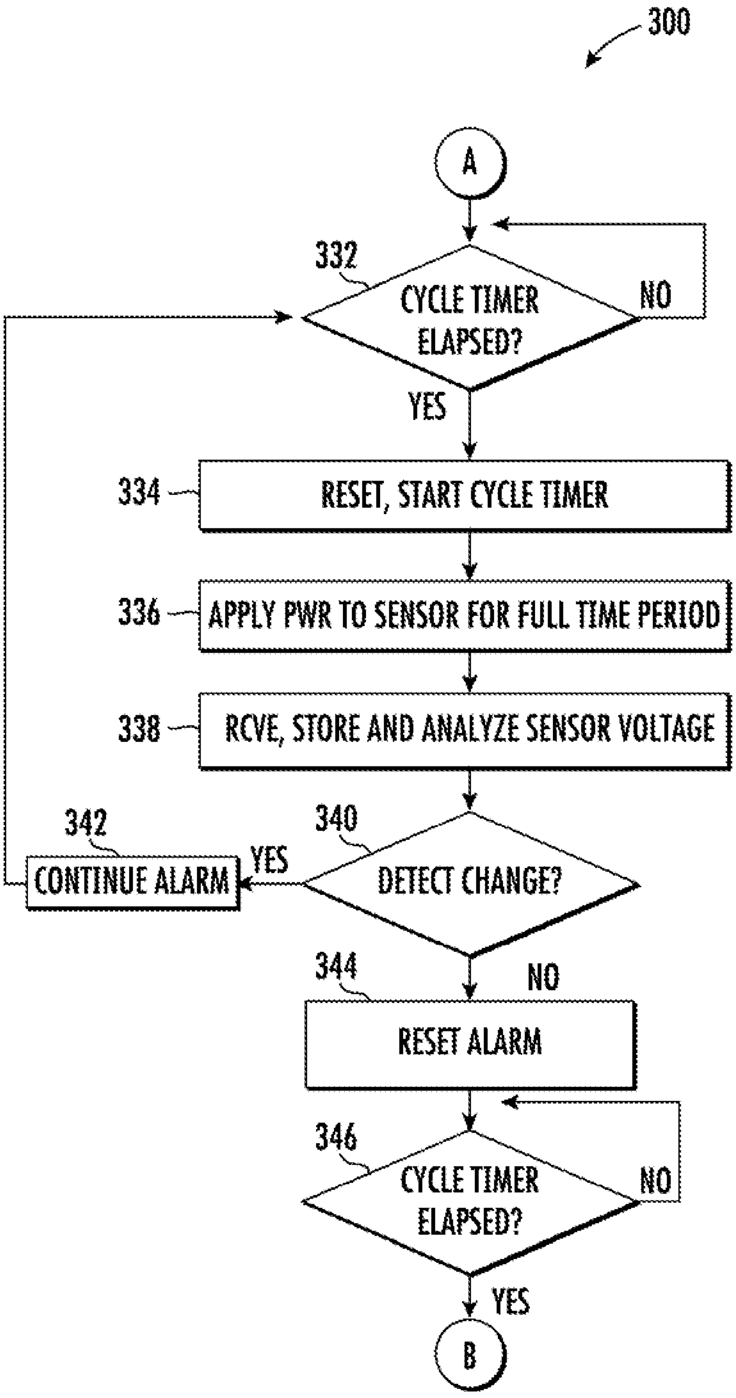

Reference will now be made to FIGS. 3A and 3B, which provides a flowchart illustrating example steps, processes, procedures, and/or operations in accordance with various embodiments of the present disclosure. Various methods described herein, including, for example, methods as shown in FIGS. 3A and 3B, may provide various technical benefits and improvements.

Referring now to FIGS. 3A and 3B, an example method 300 is illustrated. In some embodiments, the example method comprises a method for reducing power consumption of a sensing device. At step/operation 302, a processor (such as, but not limited to, the processing circuitry 102 of the example sensing device 100 described above in connection with FIG. 1) sets a counter to 1. In some embodiments, this counter is used to track the number of shorter readings as several shorter readings (e.g., 9) are done for each longer reading.

At step/operation 304, a processor (such as, but not limited to, the processing circuitry 102 of the example sensing device 100 described above in connection with FIG. 1) resets and starts a cycle timer. In some embodiments, the cycle timer is used to determine when each new reading (shorter and longer readings) should be started. For example, the cycle timer (which may be a count-up or a countdown timer) may be 1 second, such that a new reading (shorter or longer) is started every 1 second.

At step/operation 306, a processor (such as, but not limited to, the processing circuitry 102 of the example sensing device 100 described above in connection with FIG. 1) applies power to the sensing circuitry for a predetermined shorter period of time. For example, this shorter period of time may be 10 milliseconds.

At step/operation 308, a processor (such as, but not limited to, the processing circuitry 102 of the example sensing device 100 described above in connection with FIG. 1) increments the counter by one, as one shorter reading has been completed.

At step/operation 310, a processor (such as, but not limited to, the processing circuitry 102 of the example sensing device 100 described above in connection with FIG. 1) receives and stores the output (e.g., the thermopile voltage) from the sensing circuitry.

At step/operation 312, a processor (such as, but not limited to, the processing circuitry 102 of the example sensing device 100 described above in connection with FIG. 1) analyzes the output from step/operation 310 and determines if there is a change in the output from the sensing circuitry. As described above, in some embodiments this is determined by comparing the output to the corresponding portion (e.g., the first 10 milliseconds) of the most recent longer reading.

If it is determined at step/operation 312 that there is a change in the output from the sensing circuitry, the method proceeds to step/operation 314. At step/operation 314, a processor (such as, but not limited to, the processing circuitry 102 of the example sensing device 100 described above in connection with FIG. 1) sets an alarm. In some embodiments, setting an alarm may involve triggering an audible and/or a visual indication for a user. The method then proceeds to step/operation 332 on FIG. 3B, described below.

If it is determined at step/operation 312 that there is not a change in the output from the sensing circuitry, the method proceeds to step/operation 316. At step/operation 316, a processor (such as, but not limited to, the processing circuitry 102 of the example sensing device 100 described above in connection with FIG. 1) determines if the cycle timer has elapsed. If the cycle timer has not elapsed, the method remains at step/operation 316 until the cycle timer has elapsed.

If it is determined at step/operation 316 that the cycle timer has elapsed, the method proceeds to step/operation 318. At step/operation 318, a processor (such as, but not limited to, the processing circuitry 102 of the example sensing device 100 described above in connection with FIG. 1) determines if the counter has reached the predetermined number of shorter readings (e.g., 9) to be done for each longer reading.

If it is determined at step/operation 318 that the counter has not reached the predetermined number of shorter readings, the method returns to step/operation 304 to start another shorter reading. In some embodiments, the method repeats steps/operations 304-318 until it is determined at step/operation 318 that the counter has reached the predetermined number of shorter readings.

If it is determined at step/operation 318 that the counter has reached the predetermined number of shorter readings, the method proceeds to step/operation 320. At step/operation 320, a processor (such as, but not limited to, the processing circuitry 102 of the example sensing device 100 described above in connection with FIG. 1) resets and starts the cycle timer (i.e., the cycle timer referred to in step/operation 304).

At step/operation 322, a processor (such as, but not limited to, the processing circuitry 102 of the example sensing device 100 described above in connection with FIG. 1) applies power to the sensing circuitry for a predetermined longer period of time. For example, this longer period of time may be 100 milliseconds.

At step/operation 324, a processor (such as, but not limited to, the processing circuitry 102 of the example sensing device 100 described above in connection with FIG. 1) receives and stores the output (e.g., the thermopile voltage) from the sensing circuitry.

At step/operation 326, a processor (such as, but not limited to, the processing circuitry 102 of the example sensing device 100 described above in connection with FIG. 1) analyzes the output from step/operation 324 and determines if there is a change in the output from the sensing circuitry. As described above, in some embodiments this may be determined by comparing the output to the most recent longer reading, to an average of (some predetermined number of) prior longer readings, or to a weighted average of prior longer and shorter readings.

If it is determined at step/operation 326 that there is a change in the output from the sensing circuitry, the method proceeds to step/operation 328. At step/operation 328, a processor (such as, but not limited to, the processing circuitry 102 of the example sensing device 100 described above in connection with FIG. 1) sets an alarm. In some embodiments, setting an alarm may involve triggering an audible and/or a visual indication for a user. The method then proceeds to step/operation 332 on FIG. 3B, described below.

If it is determined at step/operation 326 that there is not a change in the output from the sensing circuitry, the method proceeds to step/operation 330. At step/operation 330, a processor (such as, but not limited to, the processing circuitry 102 of the example sensing device 100 described above in connection with FIG. 1) determines if the cycle timer has elapsed. If the cycle timer has not elapsed, the method remains at step/operation 330 until the cycle timer has elapsed.

If it is determined at step/operation 330 that the cycle timer has elapsed, the method proceeds to step/operation 302. At step/operation 302, a processor (such as, but not limited to, the processing circuitry 102 of the example sensing device 100 described above in connection with FIG. 1) sets the counter to 1. In some embodiments, the method repeats steps/operations 302-330 unless a change is detected at step/operation 312 or step/operation 326.

If a change is detected at step/operation 312 or step/operation 326, in some embodiments the method will switch to only performing longer readings until the change is no longer detected. In this regard, at step/operation 332, a processor (such as, but not limited to, the processing circuitry 102 of the example sensing device 100 described above in connection with FIG. 1) determines if the cycle timer has elapsed. If the cycle timer has not elapsed, the method remains at step/operation 332 until the cycle timer has elapsed.

If it is determined at step/operation 332 that the cycle timer has elapsed, the method proceeds to step/operation 334. At step/operation 334, a processor (such as, but not limited to, the processing circuitry 102 of the example sensing device 100 described above in connection with FIG. 1) resets and starts the cycle timer (i.e., the cycle timer referred to in step/operation 304).

At step/operation 336, a processor (such as, but not limited to, the processing circuitry 102 of the example sensing device 100 described above in connection with FIG. 1) applies power to the sensing circuitry for a predetermined longer period of time. For example, this longer period of time may be 100 milliseconds.

At step/operation 338, a processor (such as, but not limited to, the processing circuitry 102 of the example sensing device 100 described above in connection with FIG. 1) receives and stores the output (e.g., the thermopile voltage) from the sensing circuitry.

At step/operation 3340 a processor (such as, but not limited to, the processing circuitry 102 of the example sensing device 100 described above in connection with FIG. 1) analyzes the output from step/operation 338 and determines if there is still a change in the output from the sensing circuitry (i.e., that there is still a potentially hazardous gas present).

If it is determined at step/operation 340 that there is still a change in the output from the sensing circuitry, the method proceeds to step/operation 342 and continues the alarm. The method then proceeds to step/operation 332. In some embodiments, the method repeats steps/operations 332-340 unless a change is no longer detected at step/operation 340

If it is determined at step/operation 340 that there is no longer a change in the output from the sensing circuitry, the method proceeds to step/operation 344. At step/operation 344, a processor (such as, but not limited to, the processing circuitry 102 of the example sensing device 100 described above in connection with FIG. 1) resets the alarm. In some embodiments, resetting the alarm may involve ceasing any audible and/or a visual indication for a user.

At step/operation 346, a processor (such as, but not limited to, the processing circuitry 102 of the example sensing device 100 described above in connection with FIG. 1) determines if the cycle timer has elapsed. If the cycle timer has not elapsed, the method remains at step/operation 346 until the cycle timer has elapsed.

If it is determined at step/operation 330 that the cycle timer has elapsed, the method proceeds to step/operation 302 on FIG. 3A. At step/operation 302, a processor (such as, but not limited to, the processing circuitry 102 of the example sensing device 100 described above in connection with FIG. 1) sets the counter to 1. In some embodiments, the method repeats steps/operations 302-330 unless a change is detected at step/operation 312 or step/operation 326.

Operations and processes described herein support combinations of means for performing the specified functions and combinations of operations for performing the specified functions. It will be understood that one or more operations, and combinations of operations, may be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method and process descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," and similar words are not intended to limit the order of the steps; these words are simply used to guide the reader through the description of the methods. Further, any reference to claim elements in the singular, for example, using the articles "a," "an" or "the," is not to be construed as limiting the element to the singular and may, in some instances, be construed in the plural.

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, which are protected thereby. In all instances, the scope of the claims shall be considered on their own merits in light of this disclosure but should not be constrained by the headings set forth herein.

Also, systems, subsystems, apparatuses, techniques, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatuses and systems described herein, various other components may be used in conjunction with the components and structures disclosed herein. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying drawings, and in some cases one or more of the steps depicted may occur substantially simultaneously, or additional steps may be involved. Although specific terms are employed herein, they are used in a generic and descriptive sense only and not for purposes of limitation.

What is claimed is:

1. A thermal conductivity sensing device comprising:

a sensing element comprising one or more thermopiles;

a power supply; and a processor configured to control application of power from the power supply to the sensing element and measure a response of the sensing element to the application of power, wherein the measured response of the sensing element is based on a voltage output of the one or more thermopiles;

wherein the processor is configured to control the application of power from the power supply to the sensing element according to an adaptive duty cycle in which power is applied to the sensing element repeatedly by performing switching between a steady-state time period and at least one non-steady-state time period, wherein, for each application of power for the steady state time period, power is applied to the sensing element for at least two times for the non-steady-state time period, wherein the non-steady-state time period is a first predetermined time period in which the output voltage of the one or more thermopiles varies greater than a defined threshold when power is applied to the sensing element, indicating that the sensing element has not reached a steady state response, and wherein the steady-state time period is a second predetermined time period which is long enough for the sensing element to reach a steady state response in which the output voltage of the one or more thermopiles varies less than the defined threshold such that the output voltage is substantially constant, wherein the first predetermined time period is less than the second predetermined time period.

2. The thermal conductivity sensing device of claim 1, wherein the sensing element comprises a heated sensing element and the measured response is a temperature of the sensing element.

3. The thermal conductivity sensing device of claim 1, wherein the processor is configured to control power from the power supply to the sensing element at predetermined intervals of time.

4. The thermal conductivity sensing device of claim 1, wherein to control the application of power from the power supply to the sensing element according to the adaptive duty cycle, the processor is further configured to, after each application of power, compare the measured response with a corresponding measured response of a prior application of power to detect a change in gas concentration.

5. The thermal conductivity sensing device of claim 3, wherein to control the application of power from the power supply to the sensing element according to the adaptive duty cycle, a processor is further configured to, after each application of power for the non-steady-state time period, compare the measured response to a measured response for a corresponding portion of a prior steady-state time period to detect a change from the corresponding portion of the prior steady-state time period.

6. The thermal conductivity sensing device of claim 3, wherein to control the application of power from the power supply to the sensing element according to the adaptive duty cycle, a processor is further configured to, on detecting a change from a prior application of power for the non-steady-state time period, control the application of power from the power supply to the sensing element according to a fixed duty cycle in which power is applied to the sensing element repeatedly only for the steady-state time period until the change from the prior application of power is no longer detected.

7. The thermal conductivity sensing device of claim 3, wherein the non-steady-state time period is variable; and wherein each non-steady-state time period ends if the change in the measured response from a prior application of power is detected.

8. The thermal conductivity sensing device of claim 3, wherein the non-steady-state time period is variable; and wherein each non-steady-state time period ends when sufficient response data is measured to determine that no change in the measured response from the prior application of power has occurred.

9. The thermal conductivity sensing device of claim 1, wherein the processor is further configured to control a display of the measured response of the sensing element to the application of power based on one of (i) a response of the sensing element to a most recent application of power for a steady-state time period, (ii) an average of responses to prior applications of power for steady-state time periods, or (iii) a weighted average of responses to the prior application of power for steady-state time periods and non- steady-state time periods.

10. A method of reducing power consumption of a thermal conductivity sensing device, the method comprising:

controlling, by a processor of the thermal conductivity sensing device, application of power from a power supply of the thermal conductivity sensing device to a sensing element of the thermal conductivity sensing device, wherein the sensing element comprises one or more thermopiles;

measuring, by the processor, a response of the sensing element to the application of power, wherein the measured response of the sensing element is based on a voltage output of the one or more thermopiles; and controlling, by the processor the application of power from the power supply to the sensing element according to an adaptive duty cycle in which power is applied to the sensing element repeatedly by performing switching between a steady-state time period and non-steady-state time period, wherein for each application of power for the steady-state time period, power is applied to the sensing element for at least two times for the non-steady-state time period, wherein the non-steady-state time period is a first predetermined time period in which the output voltage of the one or more thermopiles varies greater than a defined threshold when power is applied to the sensing element, indicating that the sensing element has not reached a steady state response, wherein the steady-state time period is a second predetermined time period which is long enough for the sensing element to reach a steady state response in which the output voltage of the one or more thermopiles varies less than the defined threshold such that the output voltage is substantially constant, wherein the first predetermined time period is less than the second predetermined time period.

11. The method of claim 10, wherein the sensing element comprises a heated sensing element and the measured response is a temperature of the sensing element.

12. The method of claim 10, wherein the processor is configured to control power from the power supply to the sensing element at predetermined intervals of time.

13. The method of claim 10, wherein controlling the application of power from the power supply (116) to the sensing element according to the adaptive duty cycle further comprises, after each application of power, comparing, by the processor, the measured response to detect a change from a prior application of power.

14. The method of claim 13, further comprising:

comparing, by the processor after each application of power for the non-steady-state time period, the measured response to a measured response for a corresponding portion of a prior steady-state time period to detect the change from the corresponding portion of the prior steady-state time period.

15. The method of claim 13, wherein, on detecting the change from the prior application of power for the non-steady-state time period, the processor controls the application of power from the power supply to the sensing element according to a fixed duty cycle in which power is applied to the sensing element repeatedly only for the steady-state time period until the change from the prior application of power is no longer detected.

16. The method of claim 13, wherein the non-steady-state time period is variable; and wherein each non-steady-state time period ends if the change in the measured response from the prior application of power is detected.

17. The method of claim 13, wherein the non-steady-state time period is variable; and wherein each non-steady-state time period ends when sufficient response data is measured to determine that no change in the measured response from the prior application of power has occurred.

18. The method of claim 10, further comprising:

controlling, by the processor, a display of the measured response of the sensing element to the application of power based on one of (i) a response of the sensing element to a most recent application of power for a steady-state time period, (ii) an average of responses to prior applications of power for steady-state time periods, or (iii) a weighted average of responses to the prior application of power for steady-state time periods and non-steady-state time periods.

* * * * *